(12) United States Patent
Rosemann et al.

(10) Patent No.: US 7,681,844 B2
(45) Date of Patent: Mar. 23, 2010

(54) TIE FOR ELONGATED OBJECTS SUCH AS CABLES, PIPES OR THE LIKE

(75) Inventors: Frank Rosemann, Muenzenberg (DE); Christian Kempf, Wuerzburg (DE)

(73) Assignee: Newfrey LLC, Newark, DE (US)

( * ) Notice: Subject to any disclaimer, the term of this patent is extended or adjusted under 35 U.S.C. 154(b) by 27 days.

(21) Appl. No.: 11/671,231

(22) Filed: Feb. 5, 2007

(65) Prior Publication Data

US 2007/0194181 A1 Aug. 23, 2007

(30) Foreign Application Priority Data

Feb. 7, 2006 (DE) .................. 20 2006 001 990 U

(51) Int. Cl.
*F16L 3/08* (2006.01)
*B65D 63/00* (2006.01)

(52) U.S. Cl. .................. 248/74.3; 248/68.1; 248/71; 24/16 PB

(58) Field of Classification Search ............... 248/68.1, 248/74.3, 71; 24/16 PB
See application file for complete search history.

(56) References Cited

U.S. PATENT DOCUMENTS

| 3,214,808 | A | * | 11/1965 | Litwin | ...................... 24/16 PB |
| 4,458,385 | A | * | 7/1984 | Espinoza | ................... 24/16 PB |
| 5,584,452 | A | * | 12/1996 | Koike | ......................... 248/74.3 |
| 7,229,052 | B2 | * | 6/2007 | Takeuchi | ...................... 248/71 |

FOREIGN PATENT DOCUMENTS

DE 85 22 688.2 U1 9/1985

* cited by examiner

*Primary Examiner*—Anita M King
(74) *Attorney, Agent, or Firm*—Stephen R. Valancius; Michael P. Leary

(57) ABSTRACT

A tie for elongated objects has a flexible strap extending from a retaining head that includes side-by-side retaining and locking regions, the tops of which form a contact surface for objects to be held. The retaining region is constructed for fastening to a T-stud on a support. The locking region is constructed to receive an entry section of the strap looped about objects to be held and to lock the strap in the locking region.

19 Claims, 2 Drawing Sheets

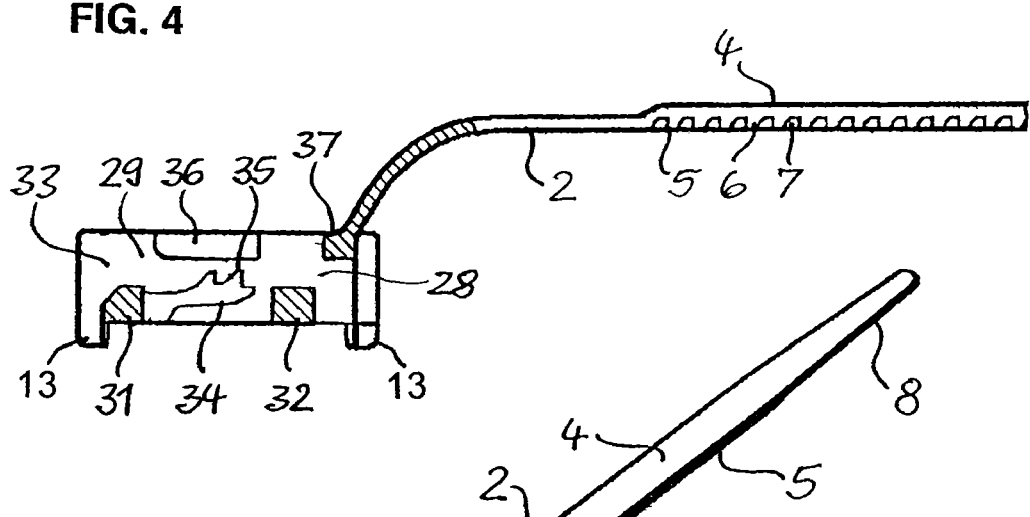
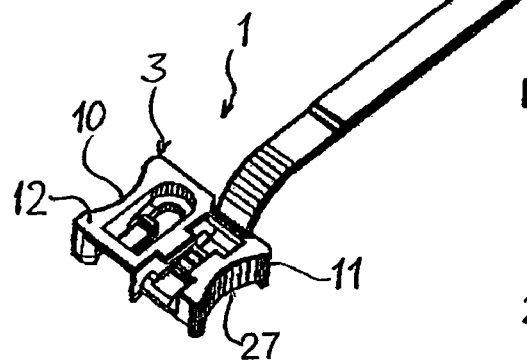
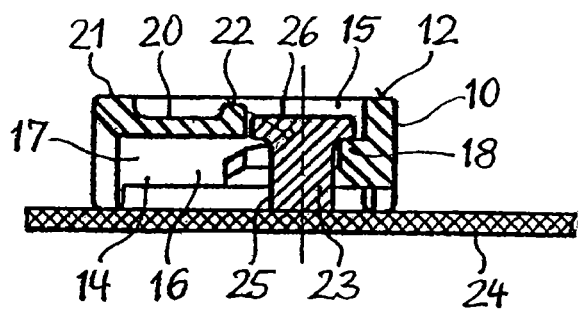
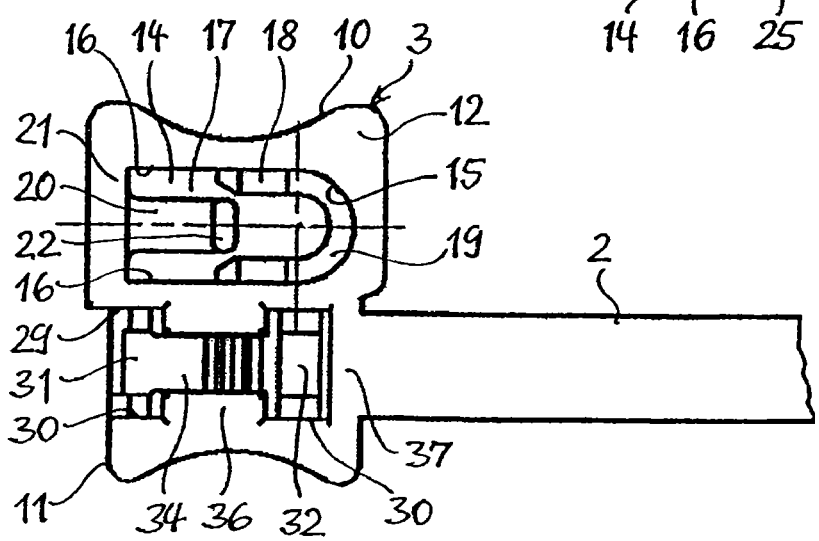
FIG. 4
FIG. 1
FIG. 3
FIG. 2

TIE FOR ELONGATED OBJECTS SUCH AS CABLES, PIPES OR THE LIKE

CROSS-REFERENCE TO RELATED APPLICATION

This application claims the benefit of German Utility Model Application No. 20 2006 001 990.1 filed Feb. 7, 2006 and incorporated herein by reference.

BACKGROUND OF THE INVENTION

This invention relates to a tie for elongated objects such as cables, pipes, or the like, having an elongated flexible strap with multiple retaining elements arranged one behind the other in the longitudinal direction of the strap, and having at one end of the strap a retaining head. In an embodiment, the retaining head has a U-shaped retaining region that accommodates a T-stud located on a supporting part, and also has a locking region with a locking channel for accommodating the flexible strap and with a member that cooperates with the retaining elements to secure the flexible strap in the locking channel.

A prior art tie is disclosed in German Patent Document G 85 22 688.2. In the prior art tie, a locking region is located above a retaining region of a retaining head, and the flexible strap molded onto the retaining region is fastened on the same side of the retaining head as an entry opening of the locking channel. The flexible strap is formed into a 180° loop, so that its opening for accommodating cables is located laterally adjacent to the retaining head. The prior art device has the disadvantage that the tie and a cable bundle require a relatively large amount of space on a supporting part. The cable bundle is inadequately supported on the support, and the retaining head has only a narrow contact surface for the cable bundle.

BRIEF DESCRIPTION OF THE INVENTION

An object of the invention is to provide a tie that permits improved support of retained elongated objects, that has a small space requirement on the support, and that is easy to use and economical to produce.

According to the invention, the retaining region and the locking region of the retaining head are located side-by-side with respect to an underside facing the supporting part, and their top side forms a contact surface extending over the retaining region and the locking region. The flexible strap is fastened to the locking region of the retaining head on one side of the contact surface and the entry opening of the locking channel is located on the other side of the contact surface.

As a result of the invention, secure support on the retaining head of the item to be held, for example a cable harness, is made possible, the retaining head forming an intermediate layer between the cable harness and the supporting part. The flexible strap preferably forms a loop of over 300°, so that even relatively large diameters can be encompassed and securely retained. Moreover, easy handling is possible, since the free end of the flexible strap can be inserted into the locking channel parallel to the surface of the supporting part. The loop formed by the flexible strap is located on the side of the retaining head facing away from the supporting part, so that no significant installation space laterally adjacent to the retaining head on the supporting part is necessary. The side-by-side arrangement of the retaining region and the locking region also achieves a small installed height of the retaining head.

In an embodiment of the invention, a U-shaped retaining region has an elastic latching finger whose free end projects into the entry opening of the U-shaped retaining region. The construction is such that the latching finger can be displaced from the entry opening by a T-stud when the latter is inserted into the U-shaped retaining region, and such that the latching finger holds the head of the T-stud in place in the U-shaped retaining region in an inserted position. Preferably, the latching finger is arranged in a recessed position in the U-shaped retaining region, which is open toward the contact surface, and the free end of the latching finger has a boundary surface that has a spacing from the plane of the contact surface that is smaller than the displacement travel of the free end of the latching finger necessary for introducing a T-stud. This construction achieves the result that elongated objects located on the tie prevent the latching finger from deflecting into a position that can release the T-stud. The objects located on the tie thus provide additional protection against spontaneous loosening of the tie from the T-stud.

To compensate for dimensional variations during assembly, provision can be made, according to an embodiment of the invention, so that the U-shaped retaining region has a length that is greater than the diameter of the T-stud. In this embodiment the U-shaped retaining region can have multiple constrictions arranged at uniform spacing from one another in the longitudinal direction, forming notches for frictionally locking the T-stud in multiple positions within the retaining region.

So that the tie can be securely gripped and moved in the direction of entry of the T-stud during installation, the side surfaces of the tie parallel to the direction of entry can be designed as concave grip recesses.

According to the invention, the flexible strap can have ratchet teeth, separated from one another by tooth gaps, which work together with a mating ratchet tooth that projects into the locking channel and is located on an elastic finger of the retaining region of the tie. The ratchet teeth and the mating ratchet tooth permit the strap to be fixed in a plurality of positions within the locking channel determined by the spacing of the ratchet teeth.

BRIEF DESCRIPTION OF THE DRAWINGS

The invention is explained in detail below with regard to illustrative (best mode) embodiments, which are shown in the drawings, wherein:

FIG. 1 is a perspective view of a first embodiment of a tie according to the invention, FIG. 2 is a top view of the retaining head of the tie of FIG. 1, FIG. 3 is a cross-section through the retaining region of the tie of FIG. 1 in the installed position, FIG. 4 is a cross-section of the locking region of the tie of FIG. 1.

DETAILED DESCRIPTION OF THE INVENTION

Figure 5:
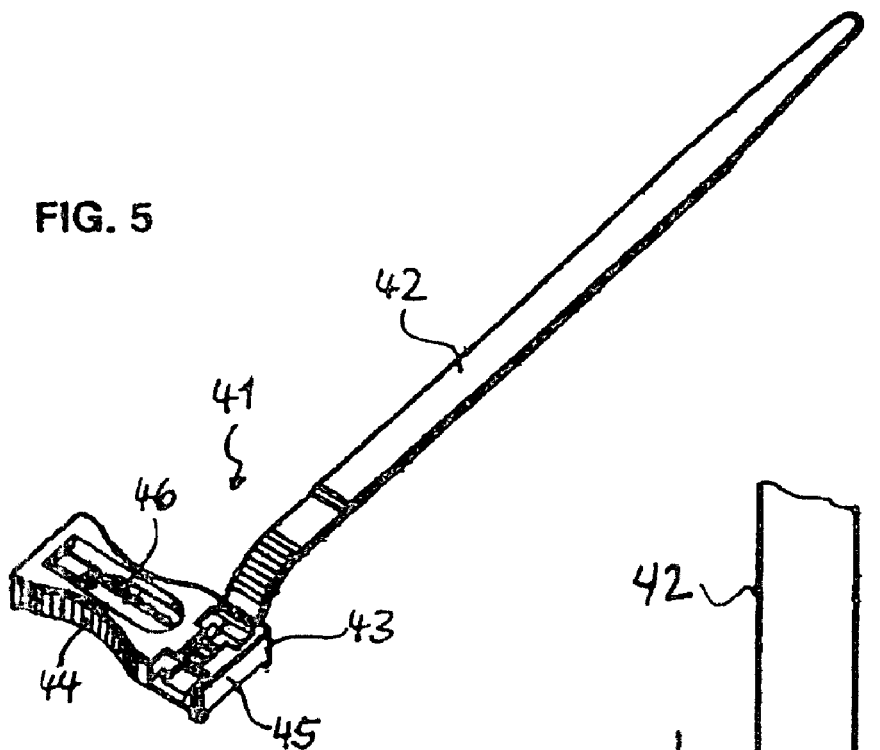
FIG. 5 is a perspective view of a second embodiment of a tie according to the invention.

The tie 1 shown in FIG. 1 is preferably manufactured as a single piece of thermoplastic material and comprises a flexible strap 2 and an approximately cuboid retaining head 3, which is arranged at one end of the strap 2. The strap 2 has an inner side 4 that faces inward when forming a closed loop and rests against the retained objects, for example cables. Opposite the inner side 4 is an outer side 5 which is provided with a large number of ratchet teeth 6. The ratchet teeth 6 extend crosswise to the longitudinal direction of the strap 2 and are arranged at regular intervals from one another. Tooth gaps 7 are formed between the ratchet teeth 6. The strap 2 has a constant width over most of its length, but an entry section 8 at its free end becomes continuously narrower toward the tip to facilitate the threading of the end into a locking region.

The retaining head 3 is divided into a retaining region 10 and a locking region 11. The locking region 11 directly adjoins the strap 2 and extends in the longitudinal direction of the latter. The retaining region 10 is located side-by-side with (laterally adjacent to) the locking region 11 and extends parallel thereto. Together, the tops of the retaining region 10 and locking region 11 form a contact surface 12 for the objects to be held. The retaining head 3 has on its underside multiple feet 13 which serve to support it on a supporting part.

The retaining region 10 has a U-shaped recess 14, which is bounded by a cylindrical surface section 15 and two parallel, flat surface sections 16. The surface sections 15, 16 extend perpendicular to the contact surface 12. Located between the surface sections 16 is an entry opening 17. Provided in the recess 14 is a U-shaped step 18 with a step surface 19 parallel to the contact surface 12. The step 18 ends at a latching finger 20 with a step surface inclined downward at the end region. The latching finger 20 is attached to a web 21 which crosses the entry opening 17 in the upper region adjacent to the contact surface 12, and the finger extends in the direction of entry below the plane of the contact surface 12. At its end, the latching finger 20 has a cam 22, which ends at the height of the plane of the contact surface 12.

As can be seen in FIG. 3, the retaining region 10 is used for fastening the retaining head 3 to a T-stud 23. T-studs are used primarily in motor vehicles to fasten components, and as a general rule are welded to a sheet metal supporting part 24, for example a car body part. The T-stud 23 has a cylindrical foot 25 and a cylindrical head 26, which has a greater diameter than the foot 25.

In order to install the retaining head 3, it is pushed onto the T-stud 23 with the entry opening 17 of the retaining region 10 approximately parallel to the surface of the supporting part 24. In this process, the head 26 slides on the step surface 19 of the step 18, displacing the latching finger 20 upward toward the contact surface 12. In the final installed position shown in FIG. 3, the head 26 is then located at the end of the recess 14 bounded by the cylindrical surface section 15, wherein the underside of the head rests against the step surface 19. As the head 26 moves to this position, the latching finger 20 slides off the head 26 and springs back to its initial position, where it rests immediately opposite the cylindrical edge of the head 26, as can be seen in FIG. 3, so that the head 26 can no longer exit the recess 14. In this way, the retaining body 3 is securely held on the supporting part 24 with the aid of the T-stud 23. Thereafter, if an object held by the strap 2 is located on the contact surface 12, the latching finger 20 is additionally held in its locking position by the cam 22, thus further reducing the danger of spontaneous loosening of the tie, for example under the influence of vibration.

In order to make it easier to push the retaining head 3 onto the T-stud 23, the retaining head 3 has concave grip recesses 27 on its opposing side surfaces parallel to the direction of installation, permitting improved application of force. The grip recesses 27 are especially advantageous when the tie 1 is fastened to the T-stud 23 before being applied to a cable harness or pipe. In contrast, if the tie 1 is first attached with the aid of the strap to an object to be fastened, which is also possible, then this object offers sufficient gripping area to transmit the necessary installation force to the tie 1.

The locking region 11 has a locking channel 28 extending in the longitudinal direction of the strap 2. The locking channel extends through the retaining head 3 and is bounded on both sides by parallel walls 29, 30. At the underside of the retaining head 3, two connecting webs 31, 32 cross the locking channel 28. The connecting web 31 is arranged at the entry opening 33 of the locking channel 28. Attached thereto is a latching finger 34 which extends toward the connecting web 32 and carries two mating ratchet teeth 35 on its top side. The locking channel 28 is bounded at its upper edge by two opposing guide strips 36 and a transverse web 37 onto which web the strap 2 is molded.

In order to fasten objects to the tie 1, the strap 2 is wrapped far enough around the objects that it forms a loop together with the retaining head 3. The entry section of the strap 2 is then introduced into the locking channel 28 through the entry opening 33, and is pushed into the channel until it extends far enough from the opposite side of the retaining head 3 to be gripped. Pulling on the entry section 8 then draws the strap 2 through the locking channel 28 until the strap tightly encloses the objects to be held. During this process, the ratchet teeth 6 slide over the mating ratchet teeth 35, with the latching finger 34 deflecting elastically downward. Once the strap 2 has reached its final position in the locking channel 28 and tends to slide back opposite to the direction of entry, the mating ratchet teeth 35 enter the nearest tooth gaps 7 of the strap 2 so that the ratchet teeth 6 and the mating ratchet teeth 35 come into engagement with one another, thereby securing the strap in the locking channel 28.

Figure 6:
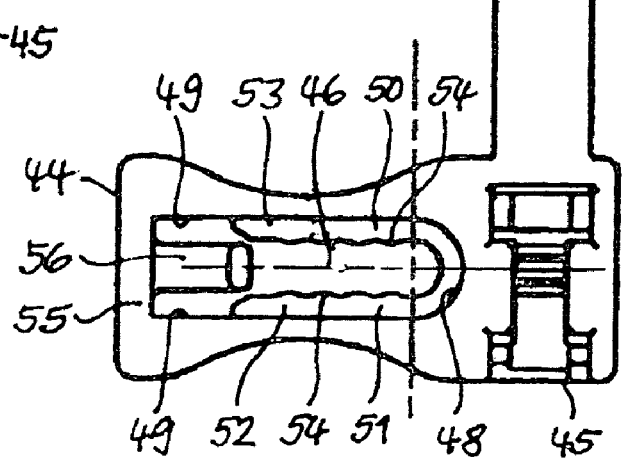
FIG. 6 is a top view of the retaining head of the tie of FIG. 5.
Figure 7:
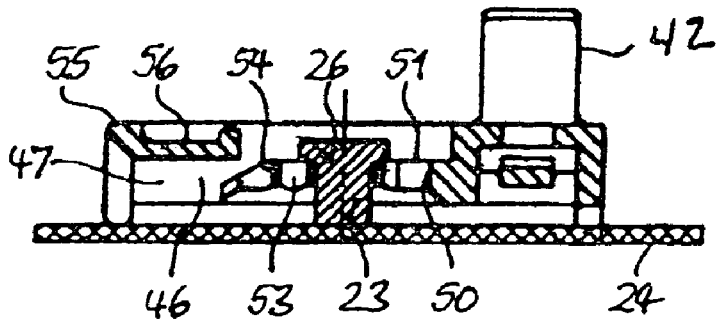
FIG. 7 is a cross-section through the retaining head of the tie of FIG. 5 in the installed position.

FIGS. 5 through 7 show a variation of a tie 41, which differs from the tie 1 in the location and size of the retaining region. The tie 41 has a strap 42 and a retaining head 43 with a retaining region 44 and a locking region 45. The strap 42 and the locking region 45 resemble those of the tie 1, and thus require no further explanation here. The retaining region 44 is located at one side of the locking region 45 and has a U-shaped recess 46 that extends transverse to the longitudinal axis of the strap 42 and whose entry opening 47 is located on the side of the retaining region 44 facing away from the locking region 45. The recess 46 is bounded by a cylindrical surface section 48 and two adjoining parallel surface sections 49, and contains a step 50 with a step surface 51. In the longitudinal direction of the surface sections 49, the recess 46 preferably has a length exceeding twice the diameter of the head 26 of a T-stud 23 associated with the retaining region 44. The step 50 is also made correspondingly long along the surface sections 49, and has two parallel sections 52, 53 whose surfaces facing one another have inward-facing and opposing resilient projections 54 at equal intervals whose clear distance from one another is smaller than the diameter of the foot 25 of a T-stud 23. Provided in the entry opening 47, as in the previously described example embodiment, is a latching finger 56 held by a web 55, whose free end is located above the open end of the step 50.

As a result of the described construction of the sections 52, 53 of the step 50, a T-stud 23 can assume various positions within the recess 46, and can in each case be brought from one position to the next by snapping past two opposing projections 54. In each position, the T-stud 23 is frictionally held in place by the projections 54. This construction permits adjustment of the retaining head 43 in the longitudinal direction of the recess 46 during installation in order to compensate for dimensional variations.

The ties described have the advantage that they can easily be installed on T-studs and provide a high degree of security against spontaneous loosening. The strap can easily be inserted into the locking region even after prior installation of the tie on a T-stud, so that it is possible to grip a cable harness, for example, even after installation of the tie. If the tie is first fastened to a cable harness, the construction of the retaining region ensures that the unit consisting of the cable harness and the tie can be installed easily.

While preferred embodiments have been shown and described, changes can be made without departing from the principles and spirit of the invention, the scope of which is defined in the following claims.

What is claimed is:

1. Tie for elongated objects comprising:
   an elongated flexible strap with multiple retaining elements arranged one behind the other in the longitudinal direction of the strap,
   a retaining head at one end of the strap, said retaining head having a retaining region to accommodate a T-stud located on a supporting part and also having a locking region with a locking channel for accommodating the flexible strap and with a retaining member that cooperates with the retaining elements to secure the flexible strap in the locking channel,
   wherein the retaining region and the locking region of the retaining head are located adjacent to one another side-by-side with respect to an underside to face a supporting part, and their top side forms a contact surface extending over the retaining region and the locking region,
   wherein the flexible strap is fastened to the locking region of the retaining head on one side of the contact surface and an entry opening of the locking channel is located on an opposite side of the contact surface, and
   wherein the retaining region is U-shaped and has an elastic latching finger with a free end that projects into an entry opening of the U-shaped retaining region and is constructed such that the latching finger can be displaced from the entry opening by a stud when the latter is inserted into the U-shaped retaining region, and such that the latching finger holds the head of the T-stud in place in the U-shaped retaining region.

2. Tie according to claim 1, wherein the latching finger is arranged in a recessed position in the U-shaped retaining region, which is open toward the contact surface, and the free end of the latching finger has a boundary surface that has a spacing from a plane of the contact surface that is smaller than displacement travel of the free end of the latching finger necessary for inserting a T-stud.

3. Tie according to claim 1, wherein the U-shaped retaining region has a length that is greater than the diameter of a T-stud.

4. Tie according to claim 3, wherein the U-shaped retaining region has multiple constrictions arranged at uniform spacing from one another in a longitudinal direction, forming notches for frictionally locking a T-stud in multiple positions within the retaining region.

5. Tie according to claim 1, wherein opposite side surfaces of the retaining head form concave grip recesses.

6. Tie according claim 1, wherein the retaining elements of the flexible strap comprise ratchet teeth, separated from each other by tooth gaps, which cooperate with the retaining member forming a mating ratchet tooth projecting into the locking channel, wherein the mating ratchet tooth is located on an elastic finger in the locking channel.

7. Tie for elongated objects, supported on a supporting part by a T-stud,
   wherein the tie comprises an elongated flexible strap extending from a retaining head,
   wherein the retaining head has a retaining region into which the T-stud is inserted and also has a locking region with a locking channel for receiving and holding a portion of the strap, with the strap forming a loop about an elongated object,
   wherein the retaining region and the locking region of the retaining head are located adjacent to one another side-by-side with respect to an underside of the retaining head facing the supporting part,
   wherein an upper side of the retaining head has a contact surface extending over the retaining region and the locking region for supporting an elongated object on the retaining head, and
   wherein the retaining region is U-shaped and has an elastic latching finger with a free end that projects into an entry opening of the U-shaped retaining region and is constructed such that the latching finger is displaced from the entry opening by the T-stud when the latter is inserted into the U-shaped retaining region, and such that the latching finger holds the head of the T-stud in place in the U-shaped retaining region.

8. Tie according to claim 7, wherein the latching finger is arranged in a recessed position in the U-shaped retaining region, which is open toward the contact surface, and the free end of the latching finger has a boundary surface that has a spacing from a plane of the contact surface that is smaller than displacement travel of the free end of the latching finger necessary for inserting the T-stud.

9. Tie according to claim 7, wherein the U-shaped retaining region has a length that is greater than the diameter of the T-stud.

10. Tie according to claim 7, wherein the U-shaped retaining region has multiple constrictions arranged at uniform spacing from one another in a longitudinal direction, forming notches for frictionally locking a T-stud in multiple positions within the retaining region.

11. Tie according to claim 7, wherein opposite side surfaces of the retaining head form concave grip recesses.

12. Tie according claim 7, wherein the flexible strap has a series of ratchet teeth, which cooperate with a mating ratchet tooth located on an elastic finger in the locking channel.

13. A tie for elongated objects comprising:
   an elongated flexible strap with multiple retaining elements,
   a retaining head at one end of the strap, said retaining head having a retaining region configured to receive a retaining part and a locking region with a locking channel which is configured to receive the flexible strap,
   wherein the retaining region is located adjacent the locking region so that they together form a contact surface for supporting an object to be held by the elongated flexible strap,
   wherein the contact surface formed by the combination of the locking region and the retaining region extends in a direction perpendicular to the length of the elongated flexible strap so that the locking region and the retaining region each support a length of the object to be held by the elongated flexible strap and wherein the retaining region is offset in a lateral direction with respect to a longitudinal direction of the elongated flexible strap such that the lateral direction is perpendicular to the longitudinal direction of the elongated flexible strap; and wherein the locking region comprises a top surface and the retaining region comprises a top surface;

wherein the top surface of the locking region and the top surface of the retaining region form at least part of the contact surface; and wherein the top surface of the retaining region and the top surface of the locking region lie in substantially the same plane.

14. The tie according to claim 13, wherein the locking region comprises a retaining member that cooperates with the retaining elements to secure the flexible strap in the locking channel.

15. The tie according to claim 14, wherein the flexible strap is fastened to the locking region of the retaining head on one side of the contact surface and an entry opening of the locking channel is located on an opposite side of the contact surface.

16. The tic according to claim 13, wherein the retaining region is U-shaped and has an elastic latching finger with a free end that projects into an entry opening of the U-shaped retaining region and is constructed such that the latching finger can be displaced from the entry opening by a T-stud when the latter is inserted into the U-shaped retaining region, and such that the latching finger holds the head of the T-stud in place in the U-shaped retaining region.

17. The tic according to claim 13, wherein the tie is configured such that a distal end of the elongated flexible strap is directed parallel to or towards the top surface of the locking region when the elongated flexible strap is received in the locking channel.

18. The tie according to claim 13, wherein the locking channel is parallel to the top surface of the locking region.

19. The tie according to claim 13, wherein the elongated flexible strap forms a loop of over 300° when the elongated flexible strap is received in the locking channel.

* * * * *